G. T. NICHOLS.
END GATE FASTENER.
APPLICATION FILED JUNE 25, 1912.
1,110,339.
Patented Sept. 15, 1914.
2 SHEETS—SHEET 1.
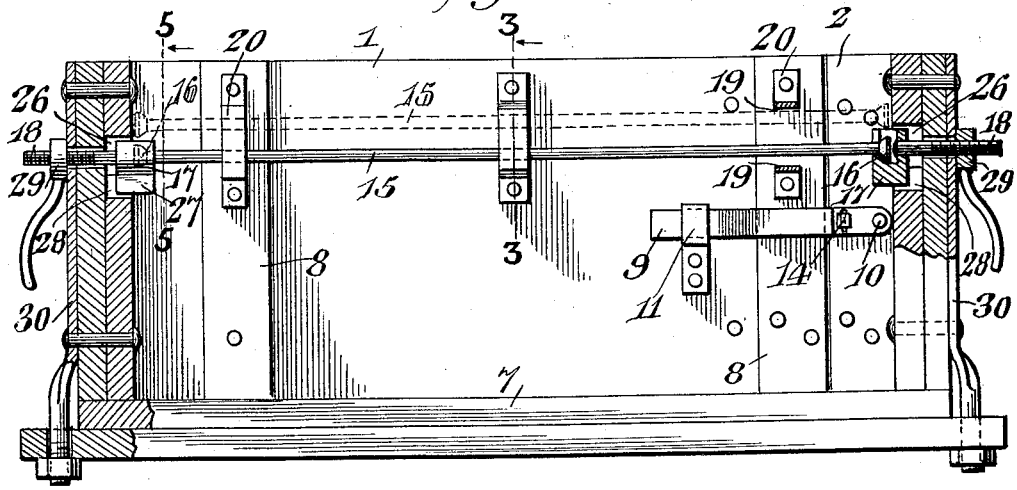
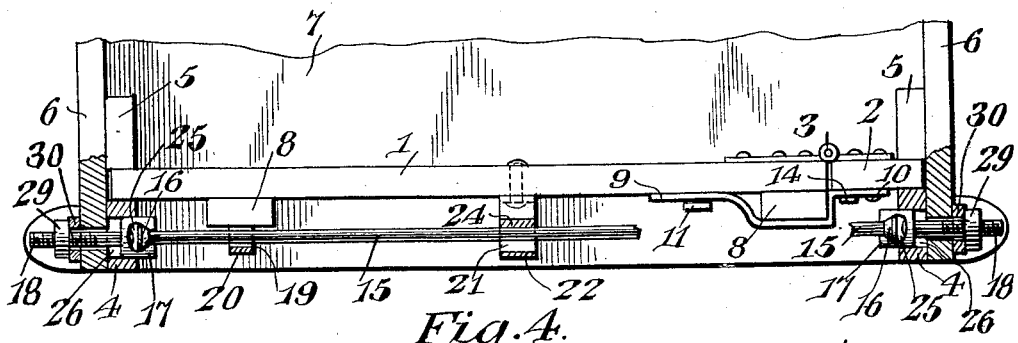
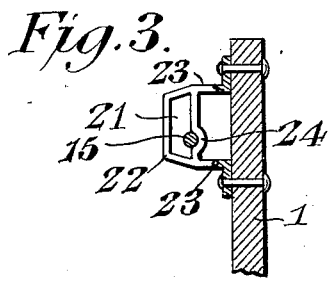
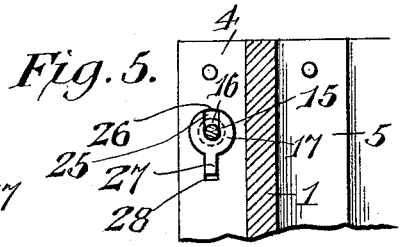
G. T. Nichols
INVENTOR
WITNESSES
BY
ATTORNEY
THE NORRIS PETERS CO., PHOTO-LITHO., WASHINGTON, D. C.

G. T. NICHOLS.
END GATE FASTENER.
APPLICATION FILED JUNE 25, 1912.
1,110,339.
Patented Sept. 15, 1914.
2 SHEETS—SHEET 2.
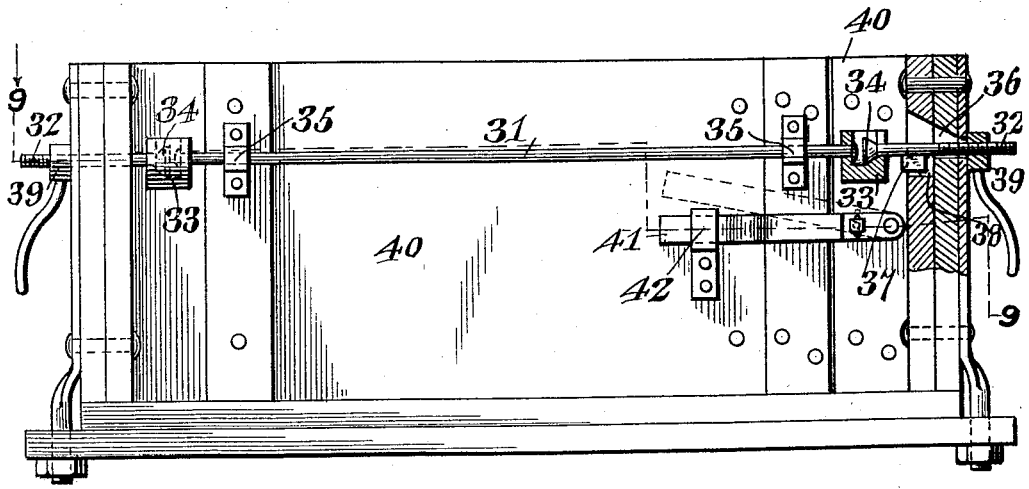
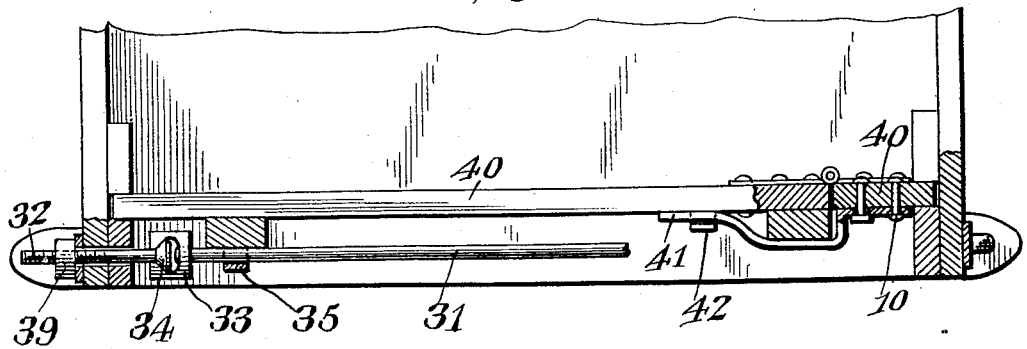
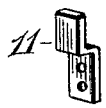
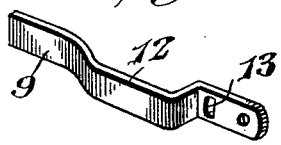
G. T. Nichols, INVENTOR

UNITED STATES PATENT OFFICE.

GEORGE T. NICHOLS, OF GAINESVILLE, TEXAS.

END-GATE FASTENER.

1,110,339.  Specification of Letters Patent.  Patented Sept. 15, 1914.

Application filed June 25, 1912. Serial No. 705,836.

*To all whom it may concern:*

Be it known that I, GEORGE T. NICHOLS, a citizen of the United States, residing at Gainesville, in the county of Cooke and State of Texas, have invented a new and useful End-Gate Fastener, of which the following is a specification.

The invention relates to improvements in end gate fasteners.

The object of the present invention is to improve the construction of end gate fasteners for that class of end gates, which are composed of two hinged sections to facilitate their ready removal, and to provide a simple and inexpensive end gate fastener of great strength and durability, adapted to form practically a solid end gate, and capable of securely fastening the end gate between the sides of a wagon body or bed and of effectually preventing the end gate from becoming accidentally unfastened and lost.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a transverse sectional view of a wagon body provided with an end gate fastener, constructed in accordance with this invention. Fig. 2 is a plan view of the same partly in section. Fig. 3 is a detail vertical sectional view on the line 3—3 of Fig. 1. Fig. 4 is a detail perspective view of one of the socket pieces and one of the end rods. Fig. 5 is a detail vertical sectional view on the line 5—5 of Fig. 1. Fig. 6 is a detail perspective view of the keeper. Fig. 7 is a detail perspective view of the locking lever. Fig. 8 is a rear elevation, partly in section illustrating another form of the invention. Fig. 9 is a horizontal sectional view on the line 9—9 of Fig. 8.

Like numerals of reference designate corresponding parts in all the figures of the drawings.

In Figs. 1 to 7 inclusive of the drawings in which is illustrated the preferred embodiment of the invention, the end gate is composed of a main section 1, and a relatively small side section 2 connected to the main section by suitable hinges 3, which are adapted to permit the end gate when unfastened to break outwardly to enable its ends to be readily disengaged from the cleats 4 and 5 of the sides 6 of a wagon body or bed 7. The main section or member 1 is preferably reinforced by spaced vertical cleats 8 and the side section is rigidly locked in alinement with the main section when the end gate is in its closed position by means of a lever 9, arranged horizontally when in its engaging position and pivoted at one end by a rivet 10, or other suitable fastening device and having its other end detachably arranged within and supported by a keeper 11. The outer pivoted end of the lever 9 is mounted on the side section 2 of the end gate, and the keeper is secured to the main section 1 of the end gate in spaced relation with the inner vertical edge of one of the cleats 8, and the lever is bowed or bent outwardly at 12 to clear the said cleat 8. The keeper 11 consists of a lower attaching portion and an upper approximately L-shaped portion extending outwardly from the end gate and upwardly in spaced relation with the same to receive the free end of the locking lever 9. The attaching portion of the keeper is secured by rivets or other suitable fastening devices to the end gate, and the lever is provided adjacent to its pivoted end with an approximately vertical arcuate slot 13, through which passes a headed fastening device 14 preferably consisting of a rivet and adapted to hold the locking lever against the end gate. The slot 13 is of sufficient length to permit the lever to be lifted out of engagement with the keeper when it is desired to remove the end gate from the wagon body or bed. The end gate is secured between the sides of the wagon body by means of a main transverse rod 15 provided at its ends with approximately cone-shaped heads 16, which are wholly received within socket pieces 17, carried by outer threaded end rods or members 18. The main transverse rod or member 15 extends through spaced vertical guides formed by openings 19 of metallic straps 20 and the said member also passes through a vertical opening 21 of a central bracket 22. The metallic straps 20, which are secured at their terminals to the upper portions of the cleats 8, are angularly bent to form vertical projecting loops to provide the said openings 19 to permit the main transverse rod to be moved vertically from the position illustrated in full lines in Fig. 1 of the drawings to that shown in dotted lines to simultaneously disengage the terminal heads 16 of the rod 15 from the socket pieces. The central bracket 22 consists of an outer vertically disposed approximately oblong portion and upper and lower approximately L-shaped arms 23, which are bolted or otherwise secured to the main section 1 at the central portion of the end gate. The inner side of the oblong body portion of the central bracket is provided with a lower approximately circular bend 24 forming a seat to receive the main rod 15 when the latter is in engagement with the socket pieces, and the upper portion of the opening of the central bracket is adapted to receive the rod 15 when the latter is lifted out of engagement with the socket pieces. The main rod is adapted to be readily sprung outwardly out of engagement with the recess or seat and when in its elevated position frictionally engages the inner walls, whereby it is maintained out of the way while removing the end gate from the body and replacing it therein. The rod forms a convenient means for enabling the end gate to be drawn outwardly in removing the same from the wagon body, and the central bracket is adapted to prevent any undue bending of the rod, which might result were the central bracket not provided. Each socket piece is rigidly secured to the inner end of its threaded end rod 18, and it is provided with a socket 25 open at the top and recessed at the side walls to conform to the configuration of the approximately cone-shaped head 16 of the main rod, which may be readily engaged with and disengaged from the socket pieces. The cleats 4 of the wagon body are provided with openings 26 to receive the socket pieces, which have depending flanges 27 arranged in lower extensions 28 of the said openings 26 and adapted to prevent rotary movement of the end rods 18. The end rods 18 receive tail nuts 29, which are adapted to draw the sides of the wagon body tightly into engagement with the end gate. The sides of the wagon body or bed are provided at their outer faces with the usual metal cleats or braces 30, which are pierced by the end rods and engaged by the tail nuts. The wagon body is not weakened by the end gate fastener, which securely retains the end gate in position and at the same time enables the end gate to be easily and quickly removed. In replacing the end gate, the outer end of the main section 1 is introduced between the cleats at one side of the wagon body and the side section 2 is arranged in position for engaging the cleats at the opposite side of the body, and the lock lever forms a convenient handle for moving the section 2 into such engagement. This brings the sections 1 and 2 into alinement, and they are locked in such position by swinging the lever downward into engagement with the keeper. The ends of the main transverse rod are then engaged with the socket pieces of the end rods, which are drawn outwardly by the tail nuts.

In Figs. 8 and 9 is illustrated another form of the invention, comprising a main transverse rod 31, threaded end rods 32 and socket pieces 33 fixed to the ends of the main rod 31 and detachably receiving approximately cone-shaped heads 34 of the end rods 32. The main transverse rod 31 is secured to the end gate by metallic straps 35, and the socket pieces 33 are provided with sockets 34 open at the top and recessed at the opposite walls to engage with the heads at the inner terminals of the end rods 32. The end rods 32 are mounted in tapered openings 36 of the sides of the wagon body and are adapted to be tilted or swung upwardly out of engagement with the socket pieces, the tapered openings 36 permitting the necessary movement to engage the heads of the end rods 32 with and disengage them from the socket pieces. The end rods 32 are provided with depending lugs or flanges 37, which are arranged in extensions 38 of the tapered openings 36. The outer portions of the end rods are threaded for the reception of tail nuts 39. The end gate 40 is composed of hinged sections, which are locked in alinement by means of a lever 41 and a keeper 42, constructed as heretofore described.

The present application contains claims generic to both forms of the invention, and the modification illustrated in Figs. 8 and 9 of the drawings also forms the subject-matter of a copending application filed May 24, 1913, Serial No. 769,731.

What is claimed is:—

1. An end gate fastener including a main rod designed to be mounted on an end gate and being of a length to extend entirely across the same, and an adjustable end rod adapted to be carried by each side of a wagon body, one of the said rods having a socket piece closed at the bottom and provided at the top with an entrance opening enlarged at the rear portion of the socket piece and the other rod having a head of a size to pass through the entrance opening and fitting in the socket piece and adapted to be drawn into tight engagement with the front portion thereof, said socket piece and head being carried into and out of engagement with each other by vertical bodily movement of one of the rods.

2. The combination with a wagon body and an end gate, of socket pieces adjustably mounted on the sides of the wagon body, a transverse rod carried by the end gate and movable upwardly and downwardly thereon to simultaneously engage its terminals with and disengage them from the socket pieces, and a device mounted on the end gate and arranged to receive and engage the rod for holding the same in an elevated position out of engagement with the socket pieces.

3. The combination with a wagon body and an end gate, of socket pieces adjustably mounted on the sides of the wagon body, a transverse rod carried by the end gate and movable upwardly and downwardly thereon to engage its terminals with and disengage them from the socket pieces, and a bracket mounted on the end gate and provided with a vertical opening receiving the rod, one of the walls of the opening being provided with a lower seat to receive the rod and having an upper engaging portion for holding the rod in an elevated position.

4. The combination with a wagon body and an end gate, of a transverse rod mounted on the end gate and movable upwardly and downwardly and provided with terminal engaging portions, means mounted on the sides of the wagon body and arranged to engage with the terminal portions of the main rod when the latter is at the limit of its downward movement, and a bracket mounted on the end gate and having a lower seat to receive the transverse rod when the same is engaged with the said means and provided with an upper engaging portion for holding the transverse rod elevated.

5. The combination with a wagon body, and an end gate, of socket pieces adjustably mounted on the sides of the wagon body, a transverse main rod extending across the end gate and carried by the same and having a limited vertical bodily movement independent of the end gate to simultaneously engage its terminals with and disengage them from the said socket pieces, and spaced guides mounted on the end gate and receiving the transverse main rod.

In testimony that I claim the foregoing as my own, I have hereto affixed my signature in the presence of two witnesses.

GEORGE T. NICHOLS.

Witnesses:
J. E. HAYWORTH,
JNO. McK. McCARTHY.

---

Copies of this patent may be obtained for five cents each, by addressing the "Commissioner of Patents, Washington, D. C."